(12) United States Patent
Nuebling

(10) Patent No.: US 11,706,056 B2
(45) Date of Patent: Jul. 18, 2023

(54) CAPACITIVE DATA TRANSMISSION OVER A GALVANIC ISOLATION

(71) Applicant: Infineon Technologies AG, Neubiberg (DE)

(72) Inventor: Marcus Nuebling, Olching-Esting (DE)

(73) Assignee: Infineon Technologies AG, Neubiberg (DE)

(*) Notice: Subject to any disclaimer, the term of this patent is extended or adjusted under 35 U.S.C. 154(b) by 184 days.

(21) Appl. No.: 17/208,987

(22) Filed: Mar. 22, 2021

(65) Prior Publication Data

US 2022/0303160 A1 Sep. 22, 2022

(51) Int. Cl.
*H04L 25/02* (2006.01)
*H04B 5/00* (2006.01)

(52) U.S. Cl.
CPC ......... *H04L 25/0266* (2013.01); *H04B 5/005* (2013.01); *H04B 5/0012* (2013.01)

(58) Field of Classification Search
CPC .... H04L 25/0266; H04B 5/0012; H04B 5/005
USPC ................................................. 375/258, 259
See application file for complete search history.

(56) References Cited

U.S. PATENT DOCUMENTS

| | | | |
|---|---|---|---|
| 6,305,709 B1 * | 10/2001 | Okada | B60R 21/0132 701/45 |
| 8,198,951 B2 | 6/2012 | Dong et al. | |
| 10,324,144 B2 | 6/2019 | Gruber et al. | |
| 10,659,173 B1 | 5/2020 | Li et al. | |
| 2004/0217806 A1 * | 11/2004 | Kasperkovitz | H03H 11/1213 327/552 |
| 2006/0291510 A1 * | 12/2006 | Juluri | H01S 5/0683 372/29.011 |
| 2009/0213914 A1 * | 8/2009 | Dong | H04L 5/14 375/219 |
| 2012/0161841 A1 | 6/2012 | Dong et al. | |

(Continued)

FOREIGN PATENT DOCUMENTS

| | | |
|---|---|---|
| DE | 102010013266 A1 | 10/2010 |
| EP | 2658195 B1 | 10/2013 |
| EP | 3016337 A1 | 5/2016 |

OTHER PUBLICATIONS

Danesh et al., "A Q-Factor Enhancement Technique for MMIC Inductors," Jun. 7-12, 1998, IEEE MTT-S International Microwave Symposium Digest, 4 pp.

(Continued)

*Primary Examiner* — Kevin M Burd
(74) *Attorney, Agent, or Firm* — Shumaker & Sieffert, P.A.

(57) ABSTRACT

In some examples, a device includes a capacitor arranged across the galvanic isolation barrier, where the capacitor is configured to communicate a single-ended signal from a first voltage domain to a second voltage domain. The device also includes a high-pass filter arranged in the second voltage domain and configured to receive the single-ended signal from the capacitor. The device further includes a low-pass filter arranged in the second voltage domain and coupled between the high-pass filter and a low-impedance node. The high-pass filter is coupled between the capacitor, the low-pass filter, and the low-impedance node, and the low-pass filter is configured to generate a differential signal.

20 Claims, 12 Drawing Sheets

(56) References Cited

U.S. PATENT DOCUMENTS

2015/0381042 A1* 12/2015 Mills .................... H04B 10/802
                                                                                     323/299
2016/0119030 A1    4/2016  Shrestha
2022/0115941 A1* 4/2022  May ........................ H02M 1/08

OTHER PUBLICATIONS

U.S. Appl. No. 17/037,264, filed Sep. 29, 2020, naming inventor Nuebling.

\* cited by examiner

CAPACITIVE DATA TRANSMISSION OVER A GALVANIC ISOLATION

TECHNICAL FIELD

This disclosure relates to communication across a galvanic isolation barrier in an electronic device.

BACKGROUND

Galvanic isolation is used in electronic devices to separate two voltage domains. As one example, a microcontroller may generate and deliver control signals to a low-side gate driver and a high-side gate driver for a half-bridge circuit. Galvanic isolation is typically not necessary between the microcontroller and the low-side gate driver, but the microcontroller will normally be galvanically isolated from the high-side gate driver because the microcontroller and the high-side gate driver are driven by different power supplies. For example, the high-side gate driver usually has a different reference power supply (e.g., reference ground) than the microcontroller. The microcontroller will normally use the same reference power supply as the low-side gate driver, while the high-side gate driver may use the switch node of the half-bridge circuit as a reference power supply and/or a reference ground node (e.g., a floating ground).

SUMMARY

This disclosure describes techniques for transmitting and receiving signals across a galvanic isolation barrier. A device of this disclosure may include a single channel for communicating signals across the galvanic isolation barrier. The single channel can include a single capacitor that is configured to communicate single-ended signals across the galvanic isolation barrier from a first voltage domain to a second voltage domain.

In some cases, sudden changes in the reference voltage on one side of the galvanic isolation barrier with respect to the reference voltage on the other side of the galvanic isolation barrier may occur, and these changes may cause undesirable jumps and glitches in the signal transmitted across the galvanic isolation barrier. Also, undesirable noise may be picked up along the communication channel. This disclosure describes techniques for transmitting a signal across a galvanic isolation barrier without using differential techniques to compensate for sudden reference voltage change and noise.

Accordingly, techniques of this disclosure may allow for communication across a galvanic isolation barrier using less chip space, as compared to using two capacitors configured to communicate differential signal across the galvanic isolation barrier. Each capacitor across the galvanic isolation barrier may account for a substantial portion of the total chip space. Thus, a single communication channel may use less chip space, be less expensive, and be less complex than multiple communication channels for differential signals.

In some examples, a device is arranged to include a galvanic isolation barrier between a first voltage domain and a second voltage domain. The device includes a capacitor arranged across the galvanic isolation barrier, where the capacitor is configured to communicate a single-ended signal from the first voltage domain to the second voltage domain. The device also includes a high-pass filter arranged in the second voltage domain and configured to receive the single-ended signal from the capacitor. The device further includes a low-pass filter arranged in the second voltage domain and coupled between the high-pass filter and a low-impedance node. The high-pass filter is coupled between the capacitor, the low-pass filter, and the low-impedance node, and the low-pass filter is configured to generate a differential signal.

In some examples, a method includes receiving a single-ended signal from a capacitor arranged across a galvanic isolation barrier, wherein the galvanic isolation barrier separates a first voltage domain from a second voltage domain. The method also includes filtering the single-ended signal through a high-pass filter arranged in the second voltage domain between the capacitor and a low-impedance node to generate a high-pass-filtered signal. The method further includes filtering the high-pass filtered signal through a low-pass filter arranged in the second voltage domain between the high-pass filter and the low-impedance node to generate a differential signal.

In some examples, a system is arranged to include a galvanic isolation barrier between a first voltage domain and a second voltage domain. The system includes an oscillator configured to generate a single-ended signal at a transmission frequency, wherein the oscillator is arranged in the first voltage domain. The system also includes a capacitor arranged across the galvanic isolation barrier, wherein the capacitor is configured to communicate the single-ended signal from the first voltage domain to the second voltage domain. The system further includes a high-pass filter arranged in the second voltage domain and coupled between the capacitor and a low-impedance node. The system includes a low-pass filter arranged in the second voltage domain and coupled between the high-pass filter and the low-impedance node, wherein the low-pass filter is configured to generate a differential signal. The system also includes a downstream filter circuit arranged in the second voltage domain. The low-pass filter is coupled between the downstream filter circuit, the high-pass filter, and the low-impedance node. The transmission frequency is higher than a corner frequency of the high-pass filter, the corner frequency of the high-pass filter is higher than a corner frequency of the low-pass filter, and wherein the corner frequency of the low-pass filter is higher than a corner frequency of the downstream filter circuit.

The details of one or more examples are set forth in the accompanying drawings and the description below. Other features, objects, and advantages will be apparent from the description and drawings, and from the claims.

BRIEF DESCRIPTION OF DRAWINGS

FIGS. 1-4A are conceptual block and circuit diagrams of a single capacitor arranged across a galvanic isolation barrier, in accordance with the techniques of this disclosure.

FIG. 4B-4E are timing diagrams illustrating the encoding of a single-ended signal, in accordance with the techniques of this disclosure.

DETAILED DESCRIPTION

This disclosure describes devices, methods, and techniques for communicating signals across a galvanic isolation barrier. An electronic device may include a galvanic isolation barrier for separating circuitry with two different voltage levels, to protect a user, and/or to protect sensitive circuitry. A capacitor may be configured to communicate single-ended signals across the galvanic isolation barrier from a first voltage domain to a second voltage domain.

However, the capacitor arranged across the galvanic isolation barrier may take up a substantial portion of the total chip area for a device. Thus, communicating across the galvanic isolation barrier via a single capacitor may save substantial chip area, as compared to a device that includes a differential pair of two capacitors arranged across the galvanic isolation barrier.

Figure 1:
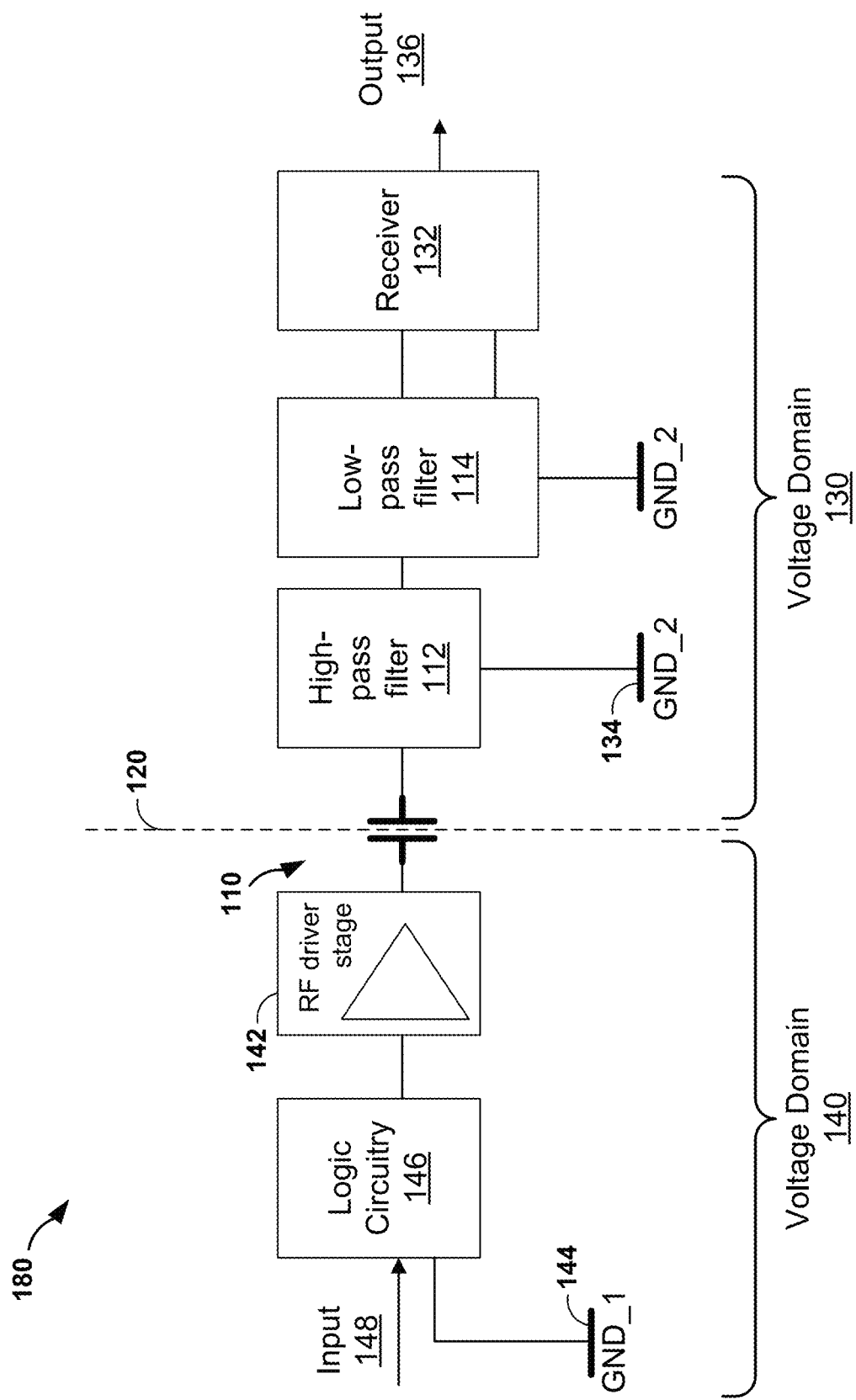

FIGS. 1-4A are conceptual block and circuit diagrams of a single capacitor 110, 210, 310, and 410 arranged across a galvanic isolation barrier 120, 220, 320, and 420, in accordance with the techniques of this disclosure. Device 180 is depicted in FIG. 1 as including voltage domains 130 and 140, which have different low-impedance nodes 134 and 144 (e.g., reference ground connections). Voltage domain 130 includes high-pass filter 112, low-pass filter 114, and receiver circuitry 132. Voltage domain 140 includes optional radio-frequency (RF) driver stages 142 and logic circuitry 146. Voltage domains 130 and 140 may be part of a single die or distributed across two or more semiconductor dies within device 180.

Capacitor 110 may be configured to communicate signals between voltage domains 130 and 140. In examples in which capacitor 110 is connected as shown in FIG. 1, capacitor 110 and high-pass filter 112 may be configured to allow high-frequency signals to pass while blocking low-frequency signals such as direct-current signals. A disturbance in the voltage level of low-impedance node 134 may have a high voltage slew rate that affects signals transmitted across galvanic isolation barrier 120 through capacitor 110. For example, the disturbance may have a slew rate of one hundred volts per nanosecond. In examples in which capacitor 110 has a capacitance of approximately one hundred femtofarads, the discharge current caused by this disturbance will be ten milliamperes, which can damage receiver circuitry 132.

In the example shown in FIG. 1, high-pass filter 112 and low-pass filter 114 are arranged in voltage domain 130. High-pass filter 112 may include one or more circuit elements that, along with capacitor 110, impede low-frequency signals. Low-pass filter 114 may include one or more circuit elements that impede high-frequency signals. For example, filters 112 and 114 may include one or more capacitors, inductors, resistors, transistors, and/or diodes.

High-pass filter 112 may be connected between capacitor 110, low-pass filter 114, and low-impedance node 134. High-pass filter 112 may be configured to receive a single-ended signal from capacitor 110 and output a filtered signal to low-pass filter 114. High-pass filter 112 may include a passive differentiator circuit. Low-pass filter 114 may be connected between high-pass filter 112, receiver circuitry 132, and low-impedance node 134. Low-pass filter 114 may be configured to receive a single-ended signal from high-pass filter 112 and output a differential signal to receiver circuitry 132. In some examples, low-pass filter 114 is configured to generate the differential signal by splitting a single-ended signal into the differential signal.

Galvanic isolation barrier 120 includes the dielectric material, insulating material, and/or oxide material of capacitor 110. Galvanic isolation barrier 120 may include mold compound between two semiconductor dies and/or a deep trench within a semiconductor die. In some examples, galvanic isolation barrier 120 may be configured to protect a user from electric shock. Additionally or alternatively, galvanic isolation barrier 120 may be configured to allow communication between the voltage domains with relatively low power dissipation, as compared to a resistance-based level shifter or a transistor-based level shifter, both of which will experience resistive power losses when stepping up electrical signals.

Voltage domain 130 may have a different voltage range than voltage domain 140. For example, the ranges of voltage domains 130 and 140 may be separated by any voltage difference, such as a few volts or less, tens of volts, or hundreds of volts. Each of voltage domains 130 and 140 may be on separate semiconductor dies within a package of device 180. Galvanic isolation barrier 120 may run between the separate dies and/or partially across one or both of the dies.

One example application of device 180 is for generating driver signals for a high-side switch of a power converter. For example, logic circuitry 146 may be part of a microcontroller that generates control signals for high-side switch(es) and low-side switch(es) of the power converter. A low-side switch of the power converter may have the same low-impedance node 144 as logic circuitry 146. A high-side switch of the power converter, however, may have a floating potential that is different than the power supply of logic circuitry 146, and low-impedance node 134 may be connected to the switch node of a half- or full-bridge circuit. The floating potential of receiver circuitry 132 may be tens or hundreds of volts higher than the power supply of logic circuitry 146. A disturbance in the voltage level at low-impedance node 134 may be generated when the high-side switch is activated, which increases the floating potential of the high-side switch. Other example applications of device 180 include an isolated controller area network or an isolated coupler.

Receiver circuitry 132 may be configured to receive a signal from capacitor 110, via filters 112 and 114, and generate output 136 based on the received signal. In some examples, receiver circuitry 132 may be configured to tolerate very low voltage ranges, such as a range of three or five volts. Receiver circuitry 132 may include sensitive input-output circuitry for receiving and processing signals from capacitor 110. In some examples, receiver circuitry 132 may include a downstream filter circuit configured to remove residual glitches and/or convert an encoded signal to a digital signal.

Logic circuitry 146 may be configured to generate a single-ended signal for transmission across galvanic isolation barrier 120 to voltage domain 130. Logic circuitry 146 may be configured to generate the single-ended signal based on input 148. In some examples, logic circuitry 146 and/or RF driver stage 142 may include an oscillator (e.g., a ring oscillator and/or an RF oscillator) for generating the single-ended signal as an oscillating signal using, for example, amplitude-shift keying such as on-off keying. Logic circuitry 146 can deliver the single-ended signal to RF driver stage 142 for amplification and/or encoding before transmitting the single-ended signal across galvanic isolation barrier 120. Logic circuitry 146 and/or RF driver stage 142 may be configured to activate or deactivate a carrier frequency in response to the signals received from logic circuitry 146. RF driver stage 142 and logic circuitry 146 may each be coupled to low-impedance node 144.

Another device for communicating signals across a galvanic isolation barrier includes two capacitors configured to transfer differential signals across the barrier. The two capacitors for communicating across the barrier may occupy a substantial area on the semiconductor die, which may increase the overall size and complexity of the device, as compared to device 180. For example, the diameter of a capacitor arranged across a galvanic isolation barrier may be approximately 250 micrometers, which may take up a substantial portion of the total available chip area.

In accordance with the techniques of this disclosure, device 180 includes a single capacitor 110 for transmitting single-ended signals across galvanic isolation barrier 120. As compared to another device that has two capacitors arranged across a galvanic isolation barrier for communicating differential signals, device 180 may be smaller, less complex, and less expensive. Thus, the single capacitor 110 may allow for the same communication across galvanic isolation barrier 120, but with substantial chip area savings.

Figure 2:
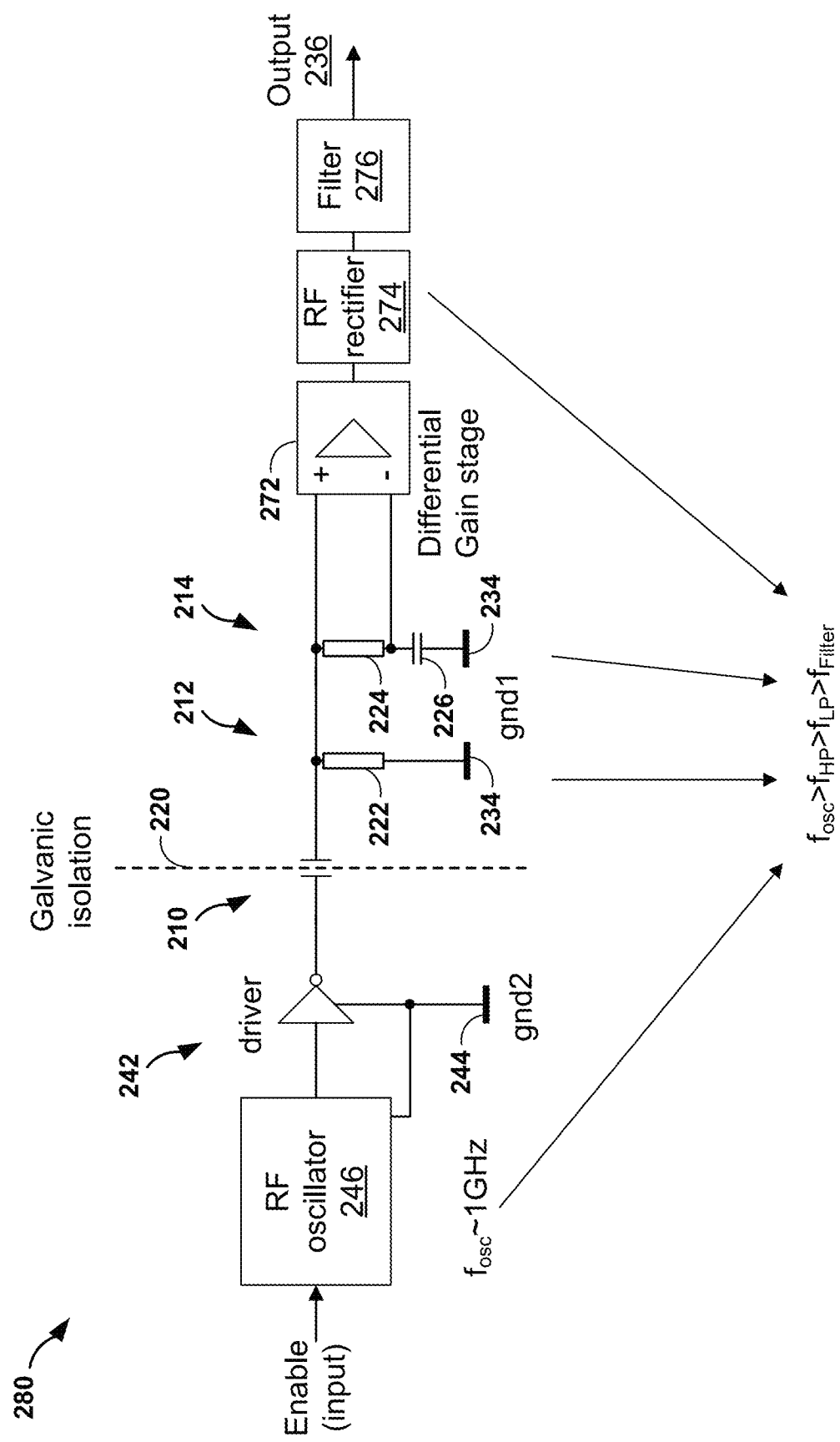

FIG. 2 is a conceptual block and circuit diagram of an example device 280 for communicating across a galvanic isolation barrier 220, in accordance with the techniques of this disclosure. In the example shown in FIG. 2, high-pass filter 212 includes an RC filter including resistor 222 and capacitor 210. Additionally or alternatively, high-pass filter 212 may include other circuit elements (e.g., resistors, capacitors, and/or inductors) that are not shown in FIG. 2. Resistor 222 may be coupled between capacitor 210 and low-pass filter 214 on one end and low-impedance node 234 on the other end. The corner frequency ($f_{HP}$) or cutoff frequency for an ideal RC high-pass filter is equal to $(2\pi RC)^{-1}$.

In the example shown in FIG. 2, low-pass filter 214 includes an RC filter including resistor 224 and capacitor 226. Additionally or alternatively, low-pass filter 214 may include other circuit elements. Resistor 224 may be coupled between low-pass filter 212 and differential gain stage 272 on one end and capacitor 226 and differential gain stage 272 on the other end. Capacitor 226 may be coupled between resistor 224 and differential gain stage 272 on one end and low-impedance node 234 on the other end. The corner frequency ($f_{LP}$) for an ideal RC low-pass filter is equal to $(2\pi RC)^{-1}$. In some examples, the corner frequency of high-pass filter 212 is greater than or equal to the corner frequency of low-pass filter 214. Low-pass filter 214 may be coupled between high-pass filter 212, low-impedance node 234, and downstream filter circuit 276.

Low-pass filter 214 may be configured to generate a differential signal at the two terminals of resistor 224. The differential signal generated by low-pass filter 214 may have a differential voltage equal to the voltage across resistor 224. The receiver circuitry of device 280 may include differential gain stage 272, RF rectifier 274, and downstream filter circuit 276. Differential gain stage 272 may be configured to receive the differential signal from low-pass filter 214 and generate an amplified signal for RF rectifier 274. Differential gain stage 272 and RF rectifier 274 may be configured to decode the single-ended signal received from filters 212 and 214 by, for example, applying a detection threshold.

RF oscillator 246 may be configured to generate a single-ended signal at a transmission frequency ($f_{osc}$). In some examples, the transmission frequency may be on the order of tens or hundreds of megahertz or at least one gigahertz. It may be desirable for the transmission frequency to be greater than the highest frequency of the noise that is being removed by filters 212 and 214. The transmission frequency of the single-ended signal generated by RF oscillator 246 may be greater than or equal to the corner frequency of high-pass filter 212. RF oscillator 246 and driver stage 242 may be coupled to low-impedance node 244. Driver stage 242 may include an inverter and/or a buffer.

Downstream filter circuit 276 may be configured to filter a signal received from RF rectifier 274 and/or from low-pass filter 214. The corner frequency of downstream filter circuit 276 ($f_{Filter}$) may be less than or equal to the corner frequency of low-pass filter 214. Downstream filter circuit 276 may be configured to generate and deliver output 236 to additional receiver circuitry that is not shown in FIG. 2. The corner frequency of downstream filter circuit 276 may limit the maximum frequency at which data can be transferred via capacitor 210 across galvanic isolation barrier 220.

Figure 3:
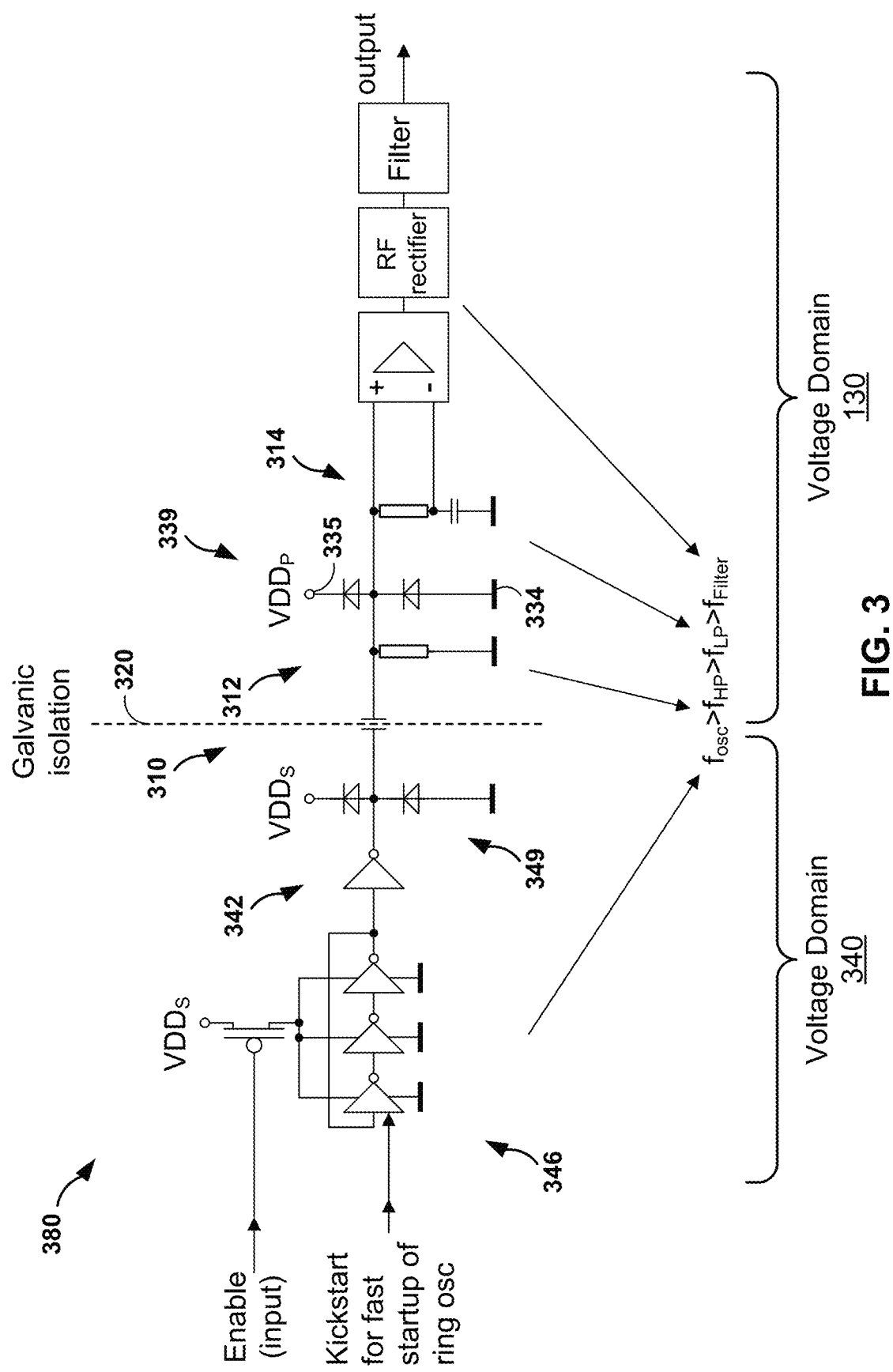
Figure 4:
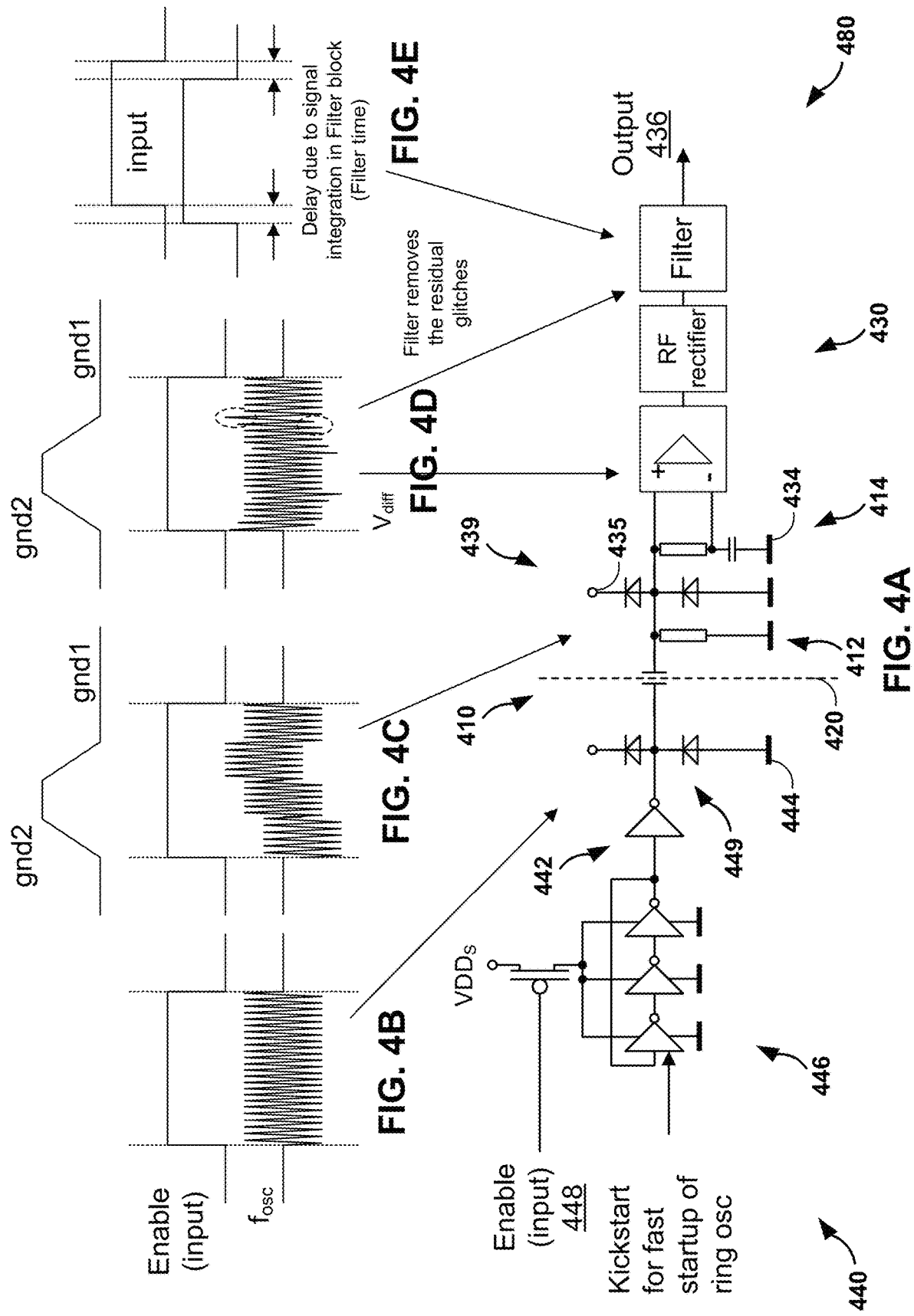

FIG. 3 is a conceptual block and circuit diagram of an example device 380 for communicating across a galvanic isolation barrier 320, in accordance with the techniques of this disclosure. Device 380 includes circuitry similar to the circuit elements of device 280 shown in FIG. 2, except that device 380 also includes the circuit elements of diode pair 339, oscillator 346, and diode pair 349.

Diode pair 349 may be coupled between driver stage 342 and capacitor 310. Diode pair 339 may be coupled between filters 312 and 314. Diode pairs 339 and 349 may be configured to protect against electrostatic discharge (ESD) events in voltage domain 340. Diode pair 339 may be configured to receive the single-ended signal from high-pass filter 312 and output a signal to low-pass filter 314. The signal outputted by diode pair 339 to low-pass filter 314 may have glitches that are caused by changes in the voltage level at low-impedance node 334.

In the example shown in FIG. 3, diode pair 339 includes a first diode coupled between high-pass filter 312 and low-pass filter 314 on one end and low-impedance node 334 on the other end. Diode pair 339 may also include a second diode coupled between high-pass filter 312 and low-pass filter 314 on one end and low-impedance node 335 on the other end. Diode pair 339 may be configured in a serial arrangement such that the anode of the first diode is coupled to the cathode of the second diode. The serial arrangement of diode pair 339 may allow electricity to flow in one direction through diode pair 339. The serial arrangement may also allow for diode pair 339 to protect against ESD events.

FIG. 4A is a conceptual block and circuit diagram of an example device 480 for communicating across a galvanic isolation barrier 420, in accordance with the techniques of this disclosure. As shown in FIG. 4A, oscillator 446 may include a ring oscillator including a chain of inverters for generating an oscillating single-ended signal. Additionally or alternatively, other types of oscillators can be used for oscillator 446 (e.g., a Wien bridge oscillator). Oscillator 446 may include an enable input that causes a transistor to deliver a voltage signal from a power supply to each of the inverters in oscillator 446. Oscillator 446 may also include a kickstart input delivered to one or more inverters of oscillator 446 for a fast startup of oscillator 446.

Oscillator 446 and driver stage 442 are arranged in voltage domain 440. Driver stage 442 may be configured to amplify an oscillating signal generated by oscillator 446. Driver stage 442 may then deliver the amplified signal to capacitor 410 for transmission across galvanic isolation barrier 420.

FIG. 4B-4E are timing diagrams illustrating the encoding of a single-ended signal. In the example of FIGS. 4B-4D, the single-ended signal is encoded using on-off-keying encoding. On-off keying is just one example of encoding for the single-ended signals communicated across a galvanic isolation barrier. Other example encoding protocols include digital amplitude modulation, amplitude shift-keying, phase shift keying, and/or quadrature amplitude modulation.

FIG. 4B shows an example of an enable signal received by oscillator 446 and the encoded signal generated by oscillator 446 in response to receiving the enable signal. In the example shown in FIG. 4B, the encoded signal may oscillate at a carrier frequency during an enable period and may be a substantially direct-current (DC) signal during a disable period. Oscillator 446 may be configured to switch on a carrier frequency in response to the input signal having a logical one or high value and switch off the carrier frequency in response to the input signal having a logical zero or low value.

FIG. 4C shows a single-ended signal that is affected by a disturbance at low-impedance node 434. The disturbance shown in FIG. 4C is a change in the voltage level at low-impedance node 434, which can cause the DC component of the single-ended signal to change. The disturbance in the voltage level of low-impedance node 434 may have a temporary offset, as shown in trapezoidal waveforms of FIGS. 4C and 4D. The disturbance may be a change in the voltage level of low-impedance node 434 relative to the voltage level of low-impedance node 444.

A high slew rate in the voltage level of low-impedance node 434 relative to low-impedance node 444 can cause a disturbance that can trigger a detection circuit, possibly causing the detection circuit to incorrectly determine that a communication pulse has been received. The filtering circuitry shown in FIG. 4A may be configured to remove most or all of a jump in the single-ended signal caused by a disturbance in the voltage level of low-impedance node 434.

Diode pair 439 may be configured to receive the single-ended signal from high-pass filter 412 and output a signal to low-pass filter 414. The signal outputted by diode pair 439 to low-pass filter 414 may have glitches, as shown in FIG. 4D, that are caused by changes in the voltage level at low-impedance node 434.

Figure 5:
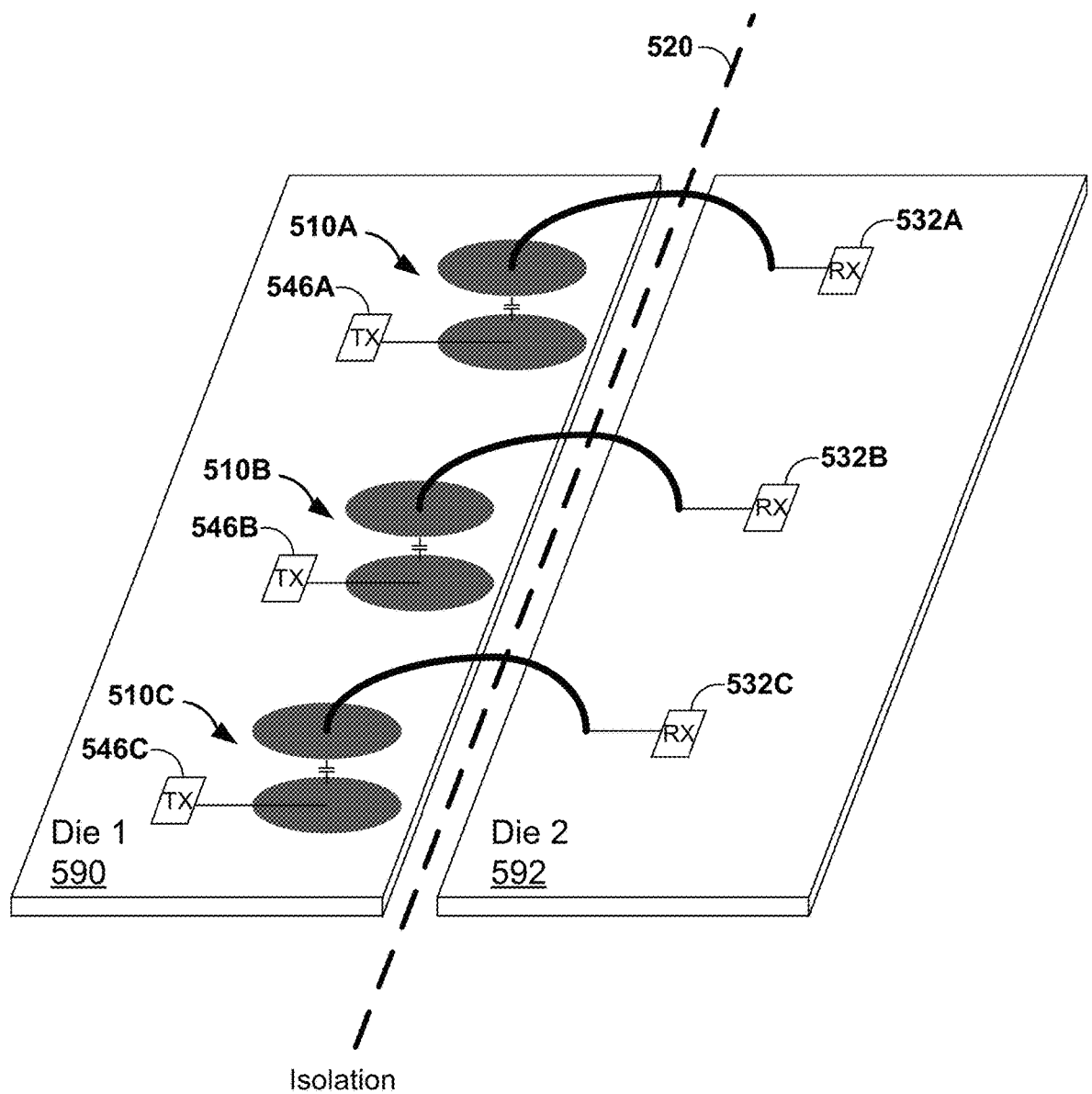
FIG. 5 is a diagram of a galvanic isolation barrier arranged between two dies, in accordance with the techniques of this disclosure.

FIG. 5 is a diagram of a galvanic isolation barrier 520 arranged between two dies 590 and 592, in accordance with the techniques of this disclosure. FIG. 5 shows an implementation with three separate communication channels, where each channel includes a single capacitor arranged across galvanic isolation barrier 520. Capacitors 510A-510C and transmitter circuits 546A-546C may be arranged on die 590, and receiver circuits 532A-532C may be arranged on die 592. Each of receiver circuits 532A-532C may include a respective high-pass filter and a respective low-pass filter, similar to the circuitry shown in FIGS. 1-4A.

Transmitter circuits 546A-546C may be connected to a shared or common low-impedance node (e.g., a shared ground node) for die 590. Alternatively, each of transmitter circuits 546A-546C may be connected to a separate, respective low-impedance node on die 590. Each of transmitter circuits 546A-546C may be separate circuits, and/or transmitter circuits 546A-546C may be controlled by a single master circuit. In some examples, die 590 includes a single transmitter circuit that is configured to transmit signals across capacitors 510A-510C.

Receiver circuits 532A-532C may be connected to a shared or common low-impedance node (e.g., a shared ground node) for die 592. Alternatively, each of the three receiver circuits may be connected to a separate, respective low-impedance node on die 592. The separate low-impedance nodes for each of the receiver circuits may be separate on die 592 but connected on a printed circuit board to which die 592 is mounted.

Figure 6:
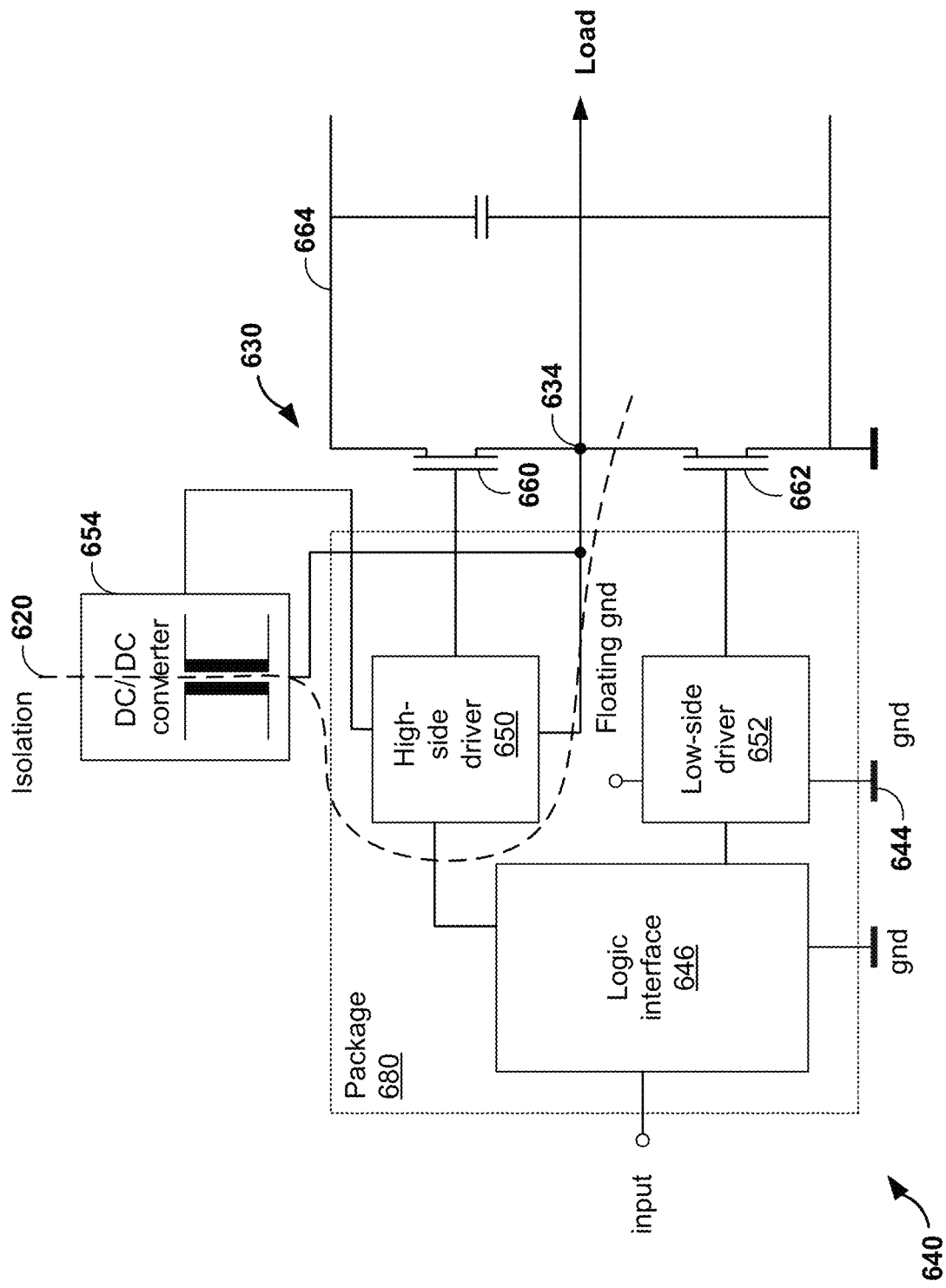
FIG. 6 is a conceptual block and circuit diagram of a high-side driver that is galvanically isolated from a logic interface, in accordance with the techniques of this disclosure.

FIG. 6 is a conceptual block and circuit diagram of a high-side driver 650 that is galvanically isolated from a logic interface 646, in accordance with the techniques of this disclosure. Package 680 may include logic interface 646, high-side driver 650, and low-side driver 652. Isolation 620 separates high-side driver 650 and high-side switch 660 in voltage domain 630 from logic interface 646, low-side driver 652, and low-side switch 662 in voltage domain 640. In some examples, the system shown in FIG. 6 may be used to supply a load such as a motor in an electric automobile or in another application.

Logic interface 646, low-side driver 652, and low-side switch 662 may be coupled to low-impedance node 644. High-side driver 650 and high-side switch 660 may be coupled to low-impedance node 634, which can serve as a low-side power rail. Low-impedance node 664, which can serve as a high-side power rail, may be hundreds or even thousands of volts higher than the voltage level of low-impedance node 644. High-side driver 650 may operate on a voltage difference on the order of tens of volts (e.g., fifteen volts) to control high-side switch 660 because the threshold voltage of high-side switch 660 may be ten or twenty volts. DC/DC converter 654 may be configured to supply power to high-side driver 650 based on the voltage level at low-impedance node 634.

Low-impedance node 634 may be referred to as the phase node or the switch node. A load may be connected to low-impedance node 634 and configured to receive power from switches 660 and 662. The voltage level at low-impedance node 634 may quickly increase and quickly decrease during each switching cycle of the half-bridge circuit of switches 660 and 662, at rates of tens or even hundreds of volts per nanosecond. The slew rate of the voltage level at low-impedance node 634 can affect the communication of data between logic interface 646 and high-side driver 650.

Package 680 may include a capacitive level shifting circuit between logic interface 646 and high-side driver 650 for communicating between voltage domains 630 and 640. Examples of capacitive level shifting circuits are shown in FIGS. 1-4A. The level shifting circuit may include filtering circuitry configured to remove the effects of the high voltage slew rates at low-impedance node 634.

Each of switches 660 and 662 may include, but are not limited to, any type of field-effect transistor (FET), a bipolar junction transistor (BJT), an insulated-gate bipolar transistor (IGBT), a high-electron-mobility transistor (HEMT), and/or another element that uses voltage and/or current for its control. Switches 660 and 662 may include n-type transistors and/or p-type transistors. Switches 660 and 662 may include semiconductor material such as silicon, silicon carbide, and/or gallium nitride. In some examples, each of switches 660 and 662 may include a plurality of transistors connected in parallel.

Figure 7:
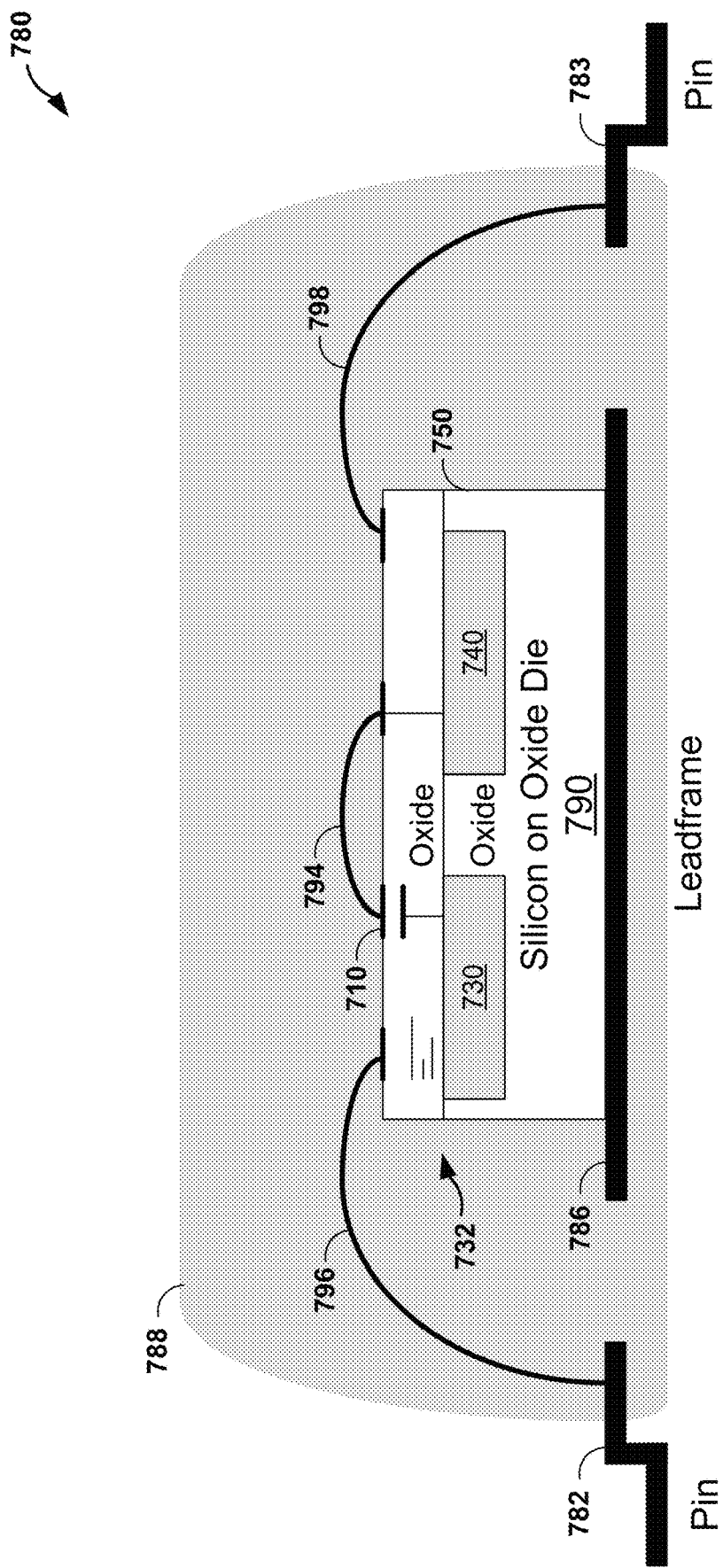
FIG. 7 is a diagram of a silicon on oxide die, in accordance with the techniques of this disclosure.

FIG. 7 is a diagram of a silicon on oxide (SOI) die 790, in accordance with the techniques of this disclosure. In the example shown in FIG. 7, package 780 includes pins 782 and 783, leadframe 786, mold compound 788, SOI die 790, and bondwires 794, 796, and 798. SOI die 790 may include capacitor 710, voltage domains 730 and 740, metal layers 732, and oxide 750. The galvanic isolation barrier in package 780 may run through capacitor 710, oxide 750, and mold compound 788.

As an alternative to package 780 shown in FIG. 7, another package may include two leadframes and two dies, where each die is mounted on a respective leadframe. The galvanic isolation barrier in the package may run between the two dies and between the two leadframes. The galvanic isolation barrier may also run through the dielectric layer of a capacitor integrated into one of the dies. Thus, the galvanic isolation barrier can be created by separate dies and separate leadframes, or through the oxide of a single die as shown in FIG. 7.

Figure 8:
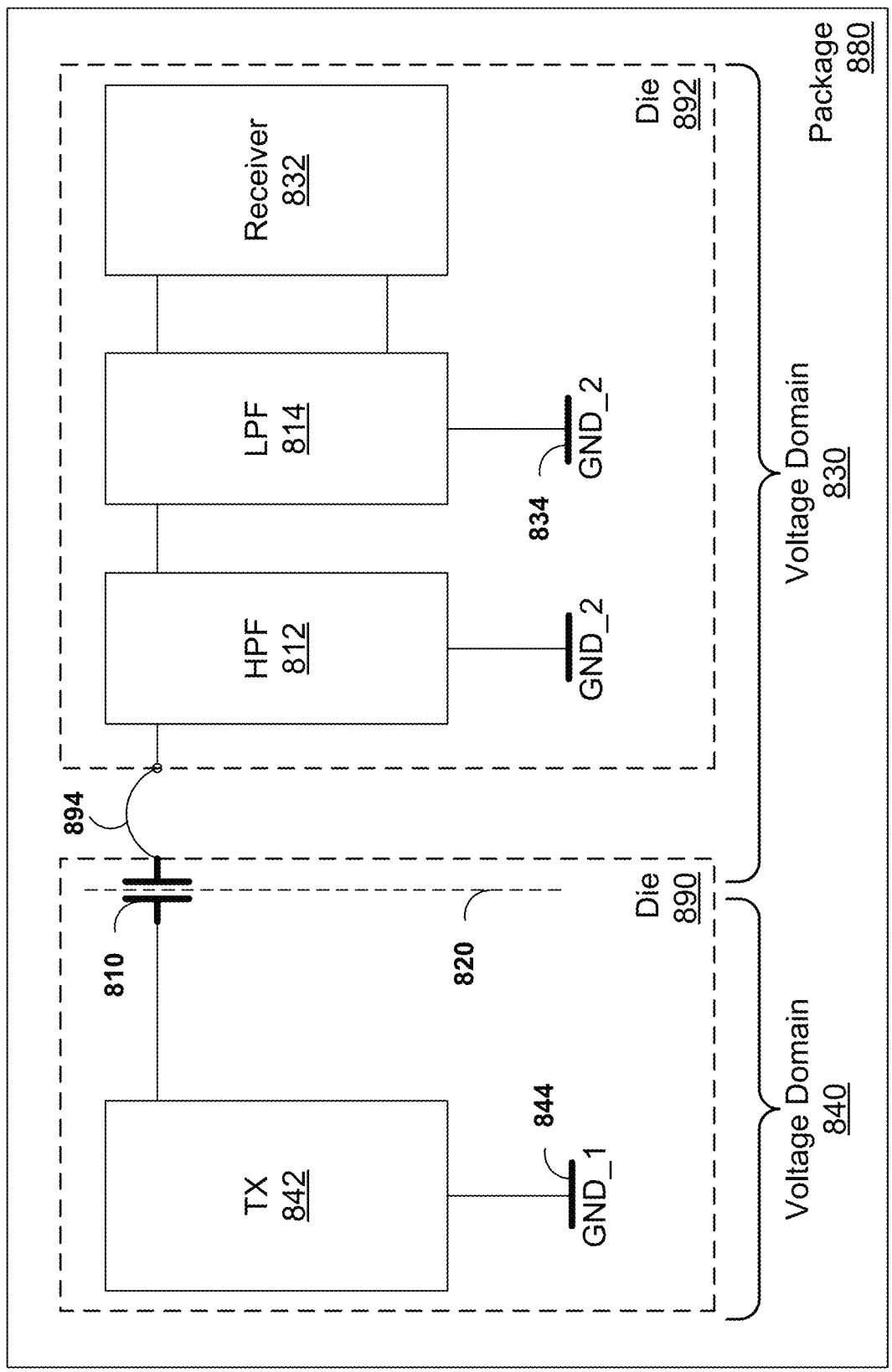
FIGS. 8-10 are conceptual block and circuit diagrams of example packages including a single communication channel, in accordance with the techniques of this disclosure.
Figure 9:
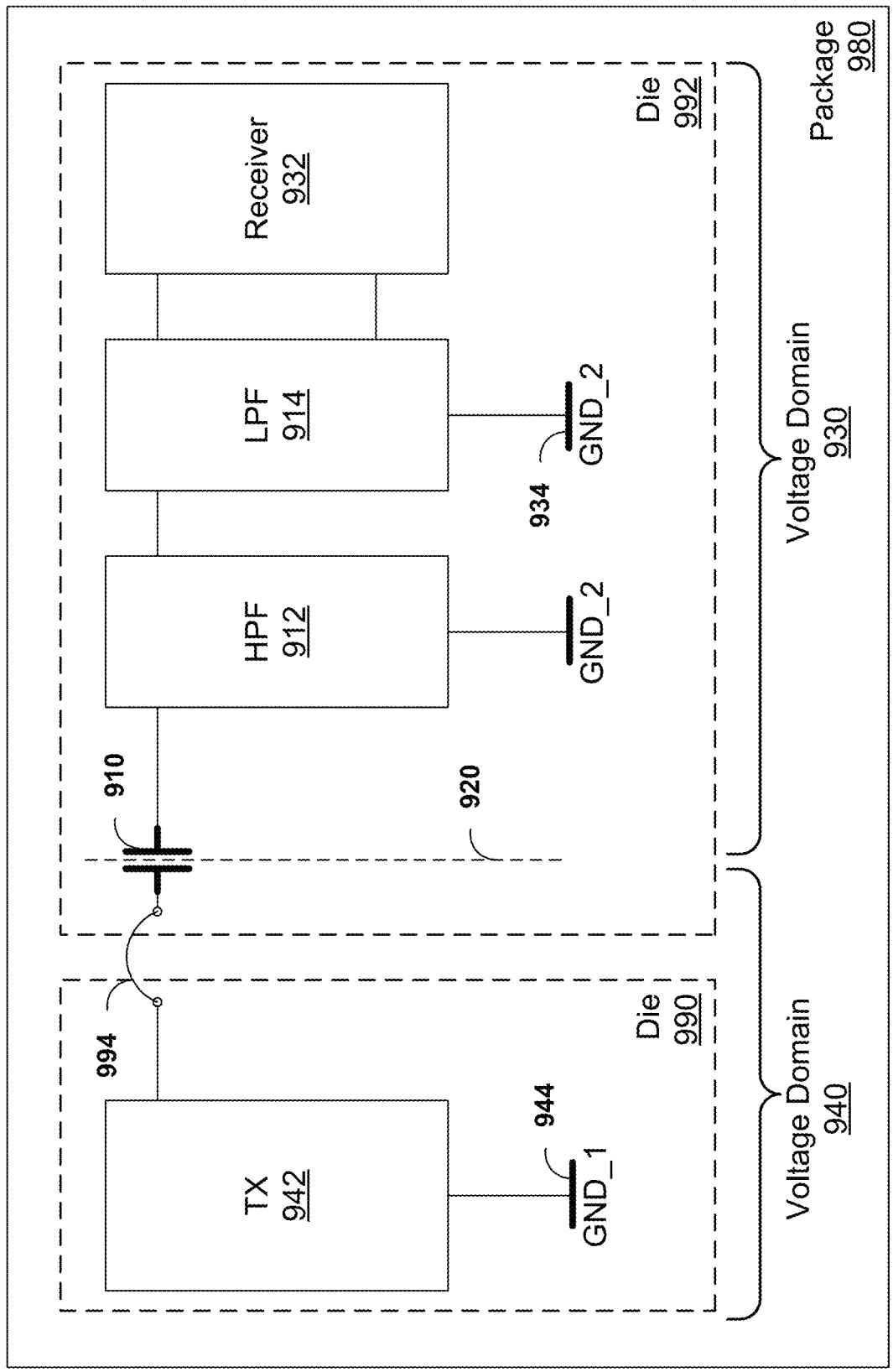
Figure 10:
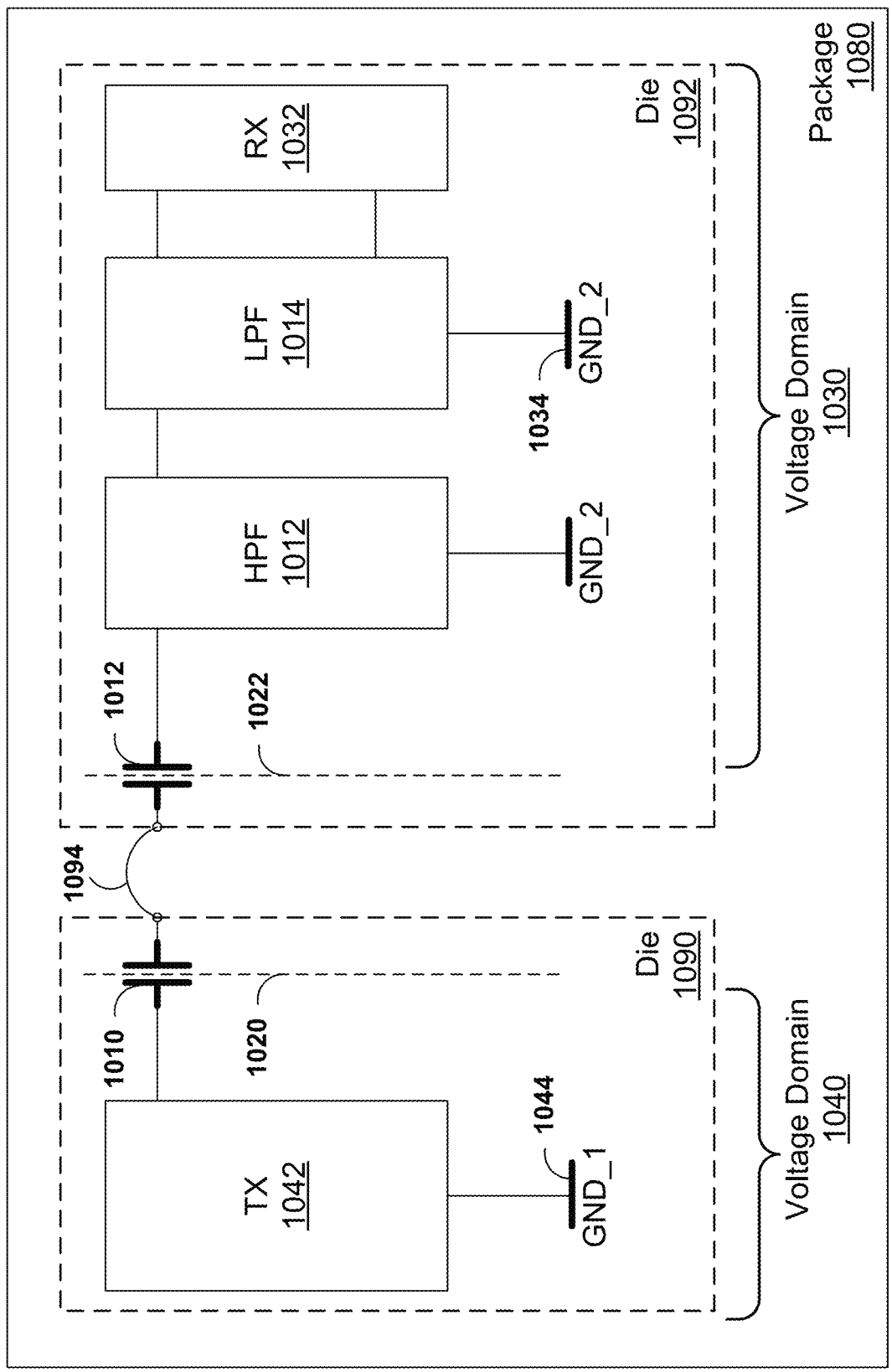

FIGS. 8-10 are conceptual block and circuit diagrams of example packages 880, 980, and 1080 including a single communication channel, in accordance with the techniques of this disclosure. Package 880, for example, includes dies 890 and 892. Galvanic isolation barrier 820 and capacitor 810 are arranged on die 890, such that bondwire 894 is within voltage domain 830. Voltage domain 830 also includes high-pass filter 812, low-pass filter 814, receiver circuitry 832, and low-impedance node 834, each of which are arranged on die 892. Voltage domain 840 includes transmitter circuitry 842 and low-impedance node 844.

In the example shown in FIG. 9, galvanic isolation barrier 920 and capacitors 910 are arranged on die 992, such that bondwire 994 is within voltage domain 940. Voltage domain 940 also includes transmitter circuitry 942 and low-impedance node 944. Voltage domain 930 includes high-pass filter 912, low-pass filter 914, receiver circuitry 932, and low-impedance node 934.

Packages 880, 980, and 1080 may include mold compound and/or any other insulative material between each pair of dies 890, 892, 990, 992, 1090, and 1092. The mold compound or insulative material may partially or completely surround each of dies 890, 892, 990, 992, 1090, and 1092. Each of the two dies shown in FIGS. 8-10 may be arranged on a separate leadframe. Although not shown in FIGS. 8-10, another possibility is that a single die may include two voltage domains, a galvanic isolation barrier, a transmitter, filters, and a receiver, where the voltage domains are separated by a galvanic isolation barrier passing through the oxides of the capacitor and through a deep trench on the single die.

Package 1080 can provide increased isolation between two voltage domains because of capacitors 1010 and 1012 connected in series, as compared to the arrangements of packages 880 and 980. Voltage domain 1030 may be completely on die 1092, and voltage domain 1040 may be completely on die 1090. A third voltage domain may exist between voltage domains 1030 and 1040, where the third voltage domain includes bondwire 1094. By including a series pair of capacitors on dies 1090 and 1092, the voltage experienced by each capacitor may be halved as compared to the voltage experienced by a single capacitor (e.g., capacitors 810 and 910). Thus, the total combined breakdown voltage of the series connection of capacitors 1010 and 1012 may be higher than the individual breakdown voltage of capacitor 810 or 910.

Figure 11:
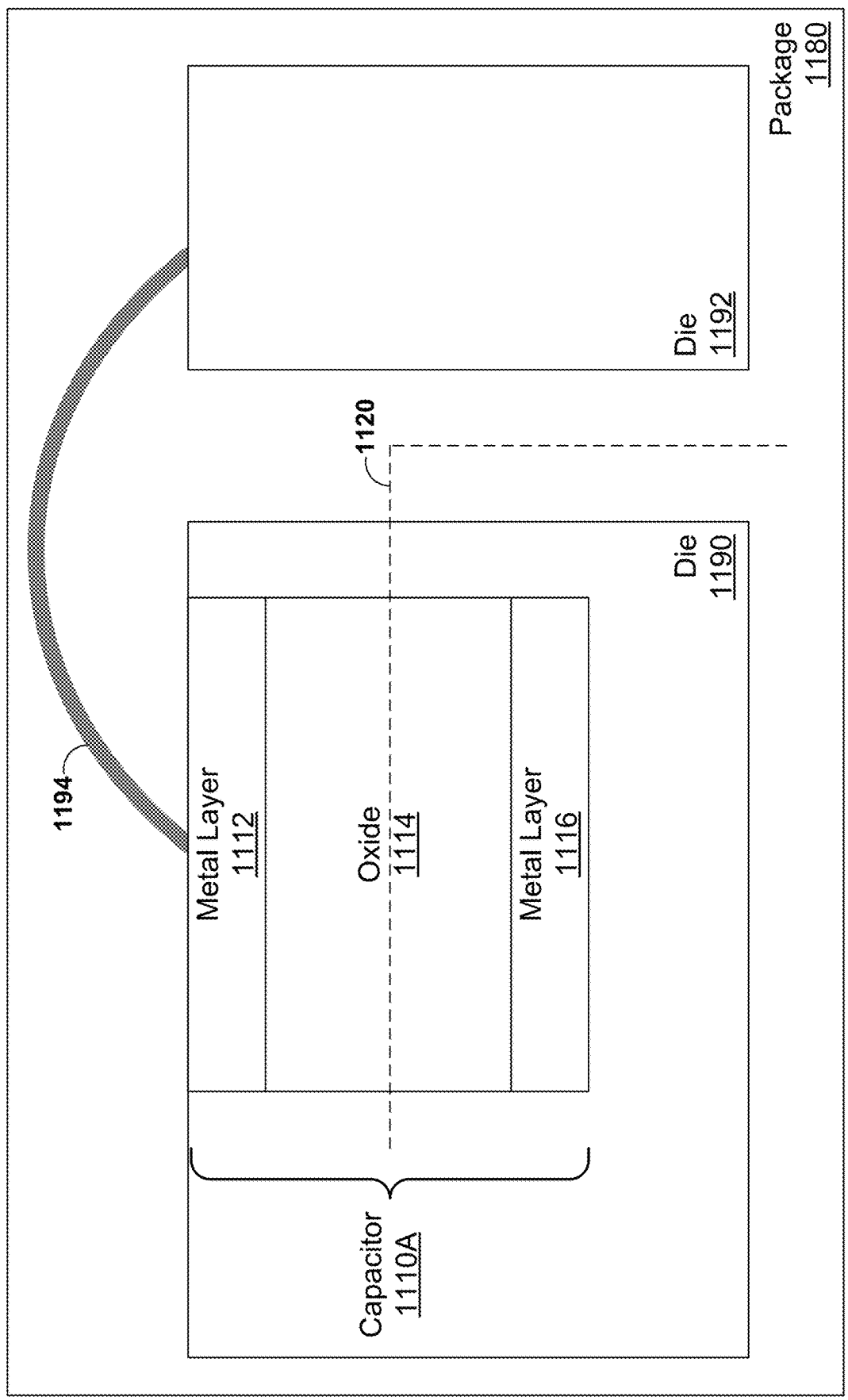
FIG. 11 is a conceptual block diagram of an example package including two dies connected by a bondwire, in accordance with the techniques of this disclosure.

FIG. 11 is a conceptual block diagram of an example package including two dies 1190 and 1192 connected by a bondwire 1194, in accordance with the techniques of this disclosure. FIG. 11 depicts an example similar to package 880 shown in FIG. 8. Other examples are possible where a capacitor is formed on die 892 (similar to package 980 shown in FIG. 9) or on both of dies 890 and 892 (similar to package 1080 shown in FIG. 10).

Capacitor 1110 includes metal layers 1112 and 1116 separated by oxide 1114. Oxide 1114 and the insulative material between dies 1190 and 1192 may form galvanic isolation barrier 1120. Oxide 1114 may be a relatively thick oxide layer with a thickness of approximately five, ten, fifteen, or twenty microns. In some examples, a thickness of oxide 1114 is greater than ten micrometers, which can result in a very high breakdown voltage. The distance between other layers in die 1190 may be less than one micrometer (e.g., three hundred nanometers).

In some examples, metal layer 1116 may be connected to transmitter circuitry. The transmitter circuitry can deliver a signal to metal layer 1116 for transmission across galvanic isolation barrier 1120. For example, pushing negative electrical charge to metal layer 1116 may attract positive electrical charge on metal layer 1112. Thus, the signal can propagate from metal layer 1112 through bondwire 1194 to die 1192, which may include a high-pass filter and a low-pass filter for filtering single-ended signals. Although FIGS. 8-11 depict the connection between dies as a bondwire, other connections are possible, such as leadframe connections, metal pad or plate connections, and/or pillar connections.

Figure 12:
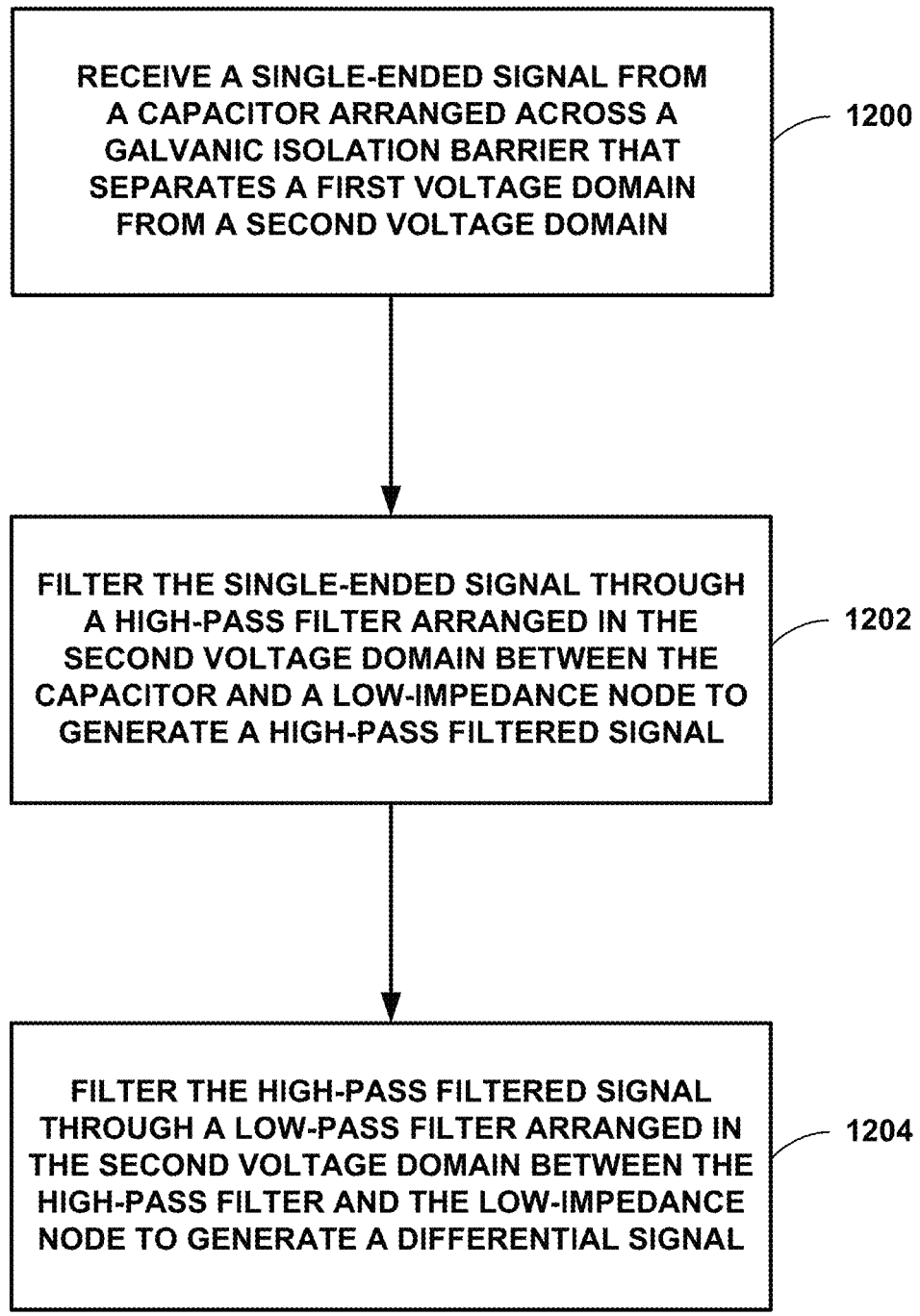
FIG. 12 is a flow diagram illustrating example techniques for communicating a single-ended signal across a galvanic isolation barrier, in accordance with the techniques of this disclosure.

FIG. 12 is a flow diagram illustrating example techniques for communicating a single-ended signal across a galvanic isolation barrier, in accordance with the techniques of this disclosure. The techniques of FIG. 12 are described with reference to the system shown in FIG. 1, although other components or devices may be used to perform similar techniques consistent with this disclosure.

In the example of FIG. 12, high-pass filter 112 receives a single-ended signal from capacitor 110 (1200), where capacitor 110 is arranged across galvanic isolation barrier 120. Galvanic isolation barrier 120 separates voltage domain 140 from voltage domain 130. The single-ended signal may include an oscillating signal, such as an OOK-encoded signal.

In the example of FIG. 12, high-pass filter 112 filters the single-ended signal to generate a high-pass-filtered signal (1202), where high-pass filter 112 is arranged in voltage domain 130 between capacitor 110 and low-impedance node 134. High-pass filter 112 may include one or more circuit elements, such as one or more resistors and one or more capacitors. The corner frequency of high-pass filter 112 may be lower than the transmission frequency of the single-ended signal.

In the example of FIG. 12, low-pass filter 114 filters the high-pass filtered signal to generate a differential signal (1204), where low-pass filter 114 is arranged in voltage domain 140 between high-pass filter 112 and low-impedance node 134. Low-pass filter 114 allow the high-pass filtered signal to pass to one of the output nodes of low-pass filter 114, while outputting a low-pass filtered version of the signal to the other output node of low-pass filter 114.

The following numbered aspects demonstrate one or more aspects of the disclosure.

Aspect 1. A device is arranged to include a galvanic isolation barrier between a first voltage domain and a second voltage domain. The device includes a capacitor arranged across the galvanic isolation barrier, where the capacitor is configured to communicate a single-ended signal from the first voltage domain to the second voltage domain. The device also includes a high-pass filter arranged in the second voltage domain and configured to receive the single-ended signal from the capacitor. The device further includes a low-pass filter arranged in the second voltage domain and coupled between the high-pass filter and a low-impedance node. The high-pass filter is coupled between the capacitor, the low-pass filter, and the low-impedance node, and the low-pass filter is configured to generate a differential signal.

Aspect 2. The device of the preceding aspect, where the high-pass filter includes a resistor coupled between the capacitor and the low-impedance node.

Aspect 3. The device of the preceding aspects or any combination thereof, where the low-pass filter includes a resistor coupled to the high-pass filter.

Aspect 4. The device of the preceding aspects or any combination thereof, where the capacitor is a first capacitor, and where the low-pass filter includes a second capacitor coupled between the resistor and the low-impedance node.

Aspect 5. The device of the preceding aspects or any combination thereof, further including an oscillator arranged in the first voltage domain.

Aspect 6. The device of the preceding aspects or any combination thereof, further including an oscillator configured to generate the single-ended signal at a transmission frequency.

Aspect 7. The device of the preceding aspects or any combination thereof, where a transmission frequency of a single-ended signal by an oscillator is higher than a corner frequency of the high-pass filter.

Aspect 8. The device of the preceding aspects or any combination thereof, further including a downstream filter circuit.

Aspect 9. The device of the preceding aspects or any combination thereof, where the low-pass filter is coupled between a downstream filter circuit, the high-pass filter, and the low-impedance node.

Aspect 10. The device of the preceding aspects or any combination thereof, where a corner frequency of the high-pass filter is higher than a corner frequency of the low-pass filter.

Aspect 11. The device of the preceding aspects or any combination thereof, where a corner frequency of the low-pass filter is higher than a corner frequency of a downstream filter circuit.

Aspect 12. The device of the preceding aspects or any combination thereof, further including an oscillator arranged in the first voltage domain and configured to generate an on-off-keying signal based on an input signal.

Aspect 13. The device of the preceding aspects or any combination thereof, further including a driver stage arranged in the first voltage domain.

Aspect 14. The device of the preceding aspects or any combination thereof, where the driver stage is configured to amplify the on-off keying signal.

Aspect 15. The device of the preceding aspects or any combination thereof, where the capacitor is configured to communicate the on-off keying signal from the first voltage domain to the second voltage domain.

Aspect 16. The device of the preceding aspects or any combination thereof, further including a receiver circuit.

Aspect 17. The device of the preceding aspects or any combination thereof, where the low-pass filter is coupled between the high-pass filter, a receiver circuit, and the low-impedance node.

Aspect 18. The device of the preceding aspects or any combination thereof, where the high-pass filter is coupled between the low-pass filter, the capacitor, and the low-impedance node.

Aspect 19. The device of the preceding aspects or any combination thereof, further including a package including a first die and a second die, where the high-pass filter and the low-pass filter are arranged on the second die.

Aspect 20. The device of the preceding aspects or any combination thereof, where the capacitor is arranged on a first die, and where the high-pass filter and the low-pass filter are arranged on a second die.

Aspect 21. The device of the preceding aspects or any combination thereof, where the capacitor is a first capacitor arranged on a first die, the device further including a second capacitor arranged on a second die, where the second capacitor is coupled between the first capacitor and the high-pass filter.

Aspect 22. The device of the preceding aspects or any combination thereof, further including a first diode coupled between the high-pass filter, the low-pass filter, and the low-impedance node.

Aspect 23. The device of the preceding aspects or any combination thereof, further including a second diode coupled between the high-pass filter, the low-pass filter, and a second low-impedance node, where the second low-impedance node is separate from the first low-impedance node.

Aspect 24. The device of the preceding aspects or any combination thereof, further including where a first diode coupled to a second diode in a serial arrangement, where a node between the first and second diodes is coupled between the high-pass filter and the low-pass filter.

Aspect 25. The device of the preceding aspects or any combination thereof, further including a second capacitor arranged across the galvanic isolation barrier; a second high-pass filter arranged in the second voltage domain and configured to receive a second single-ended signal from the second capacitor; and a second low-pass filter arranged in the second voltage domain and coupled between the second high-pass filter and a second low-impedance node in the second voltage domain, where the second high-pass filter is coupled between the second capacitor, the second low-pass filter, and the second low-impedance node, and where the second low-pass filter is configured to generate a second differential signal.

Aspect 26. The device of the preceding aspects or any combination thereof, further including a third capacitor arranged across the galvanic isolation barrier; a third high-pass filter arranged in the third voltage domain and configured to receive a third single-ended signal from the third capacitor; and a third low-pass filter arranged in the third voltage domain and coupled between the third high-pass filter and a third low-impedance node in the third voltage domain, where the third high-pass filter is coupled between the third capacitor, the third low-pass filter, and the third low-impedance node, and where the third low-pass filter is configured to generate a third differential signal.

Aspect 27. A system is arranged to include a galvanic isolation barrier between a first voltage domain and a second voltage domain. The system includes an oscillator configured to generate a single-ended signal at a transmission frequency, where the oscillator is arranged in the first voltage domain. The system also includes a capacitor arranged across the galvanic isolation barrier, where the capacitor is configured to communicate the single-ended signal from the first voltage domain to the second voltage domain. The system further includes a high-pass filter arranged in the second voltage domain and coupled between the capacitor and a low-impedance node. The system includes a low-pass filter arranged in the second voltage domain and coupled between the high-pass filter and the low-impedance node, where the low-pass filter is configured to generate a differential signal. The system also includes a downstream filter circuit arranged in the second voltage domain. The low-pass filter is coupled between the downstream filter circuit, the high-pass filter, and the low-impedance node. The transmission frequency is higher than a corner frequency of the high-pass filter, the corner frequency of the high-pass filter is higher than a corner frequency of the low-pass filter, and where the corner frequency of the low-pass filter is higher than a corner frequency of the downstream filter circuit.

Aspect 28. The system of the preceding aspect, where the high-pass filter includes a resistor coupled between the capacitor and the low-impedance node.

Aspect 29. The system of the preceding aspects or any combination thereof, where the low-pass filter includes a resistor coupled to the high-pass filter.

Aspect 30. The system of the preceding aspects or any combination thereof, where the capacitor is a first capacitor, and where the low-pass filter includes a second capacitor coupled between the resistor and the low-impedance node.

Aspect 31. The system of the preceding aspects or any combination thereof, further including a package including a first die and a second die, where the high-pass filter and the low-pass filter are arranged on the second die.

Aspect 32. The system of the preceding aspects or any combination thereof, where the capacitor is arranged on a first die, and where the high-pass filter and the low-pass filter are arranged on a second die.

Aspect 33. The system of the preceding aspects or any combination thereof, where the capacitor is a first capacitor arranged on a first die, the device further including a second capacitor arranged on a second die, where the second capacitor is coupled between the first capacitor and the high-pass filter.

Aspect 34. The device of the preceding aspects or any combination thereof, further including a first diode coupled between the high-pass filter, the low-pass filter, and the low-impedance node.

Aspect 35. The device of the preceding aspects or any combination thereof, further including a second diode coupled between the high-pass filter, the low-pass filter, and a second low-impedance node, where the second low-impedance node is separate from the first low-impedance node.

Aspect 36. A method includes receiving a single-ended signal from a capacitor arranged across a galvanic isolation barrier, where the galvanic isolation barrier separates a first voltage domain from a second voltage domain. The method also includes filtering the single-ended signal through a high-pass filter arranged in the second voltage domain between the capacitor and a low-impedance node to generate a high-pass-filtered signal. The method further includes filtering the high-pass filtered signal through a low-pass filter arranged in the second voltage domain between the high-pass filter and the low-impedance node to generate a differential signal.

Aspect 37. The method of the preceding aspect, further including generating, by an oscillator arranged in the first voltage domain, the single-ended signal at a transmission frequency, where the transmission frequency is higher than a corner frequency of the high-pass filter.

Aspect 38. The method of the preceding aspects or any combination thereof, where the corner frequency of the high-pass filter is higher than a corner frequency of the low-pass filter.

Various examples of the disclosure have been described. Any combination of the described systems, operations, or functions is contemplated. These and other examples are within the scope of the following claims.

What is claimed is:

1. A device arranged to include a galvanic isolation barrier between a first voltage domain and a second voltage domain, the device comprising:
   a capacitor arranged across the galvanic isolation barrier, wherein the capacitor is configured to communicate a single-ended signal from the first voltage domain to the second voltage domain;
   a high-pass filter arranged in the second voltage domain and configured to receive the single-ended signal from the capacitor;
   a low-pass filter arranged in the second voltage domain and coupled between the high-pass filter and a low-impedance node, wherein output of the high-pass filter comprises a first signal that defines input to the low pass filter; and
   a differential gain stage,
   wherein the high-pass filter is coupled between the capacitor, the low-pass filter, and the low-impedance node,
   wherein the low-pass filter is configured to filter the first signal to generate a second signal, and
   wherein the differential gain stage is configured to:
   receive the first signal from the high-pass filter and the second signal from the low-pass filter; and
   output a third signal based on the first signal and the second signal.

2. The device of claim 1, wherein the high-pass filter comprises a resistor coupled between the capacitor and the low-impedance node.

3. The device of claim 1, wherein the capacitor is a first capacitor, and wherein the low-pass filter comprises:
   a resistor coupled to the high-pass filter; and
   a second capacitor coupled between the resistor and the low-impedance node.

4. The device of claim 1, further comprising an oscillator arranged in the first voltage domain,
   wherein the oscillator is configured to generate the single-ended signal at a transmission frequency, and
   wherein the transmission frequency is higher than a corner frequency of the high-pass filter.

5. The device of claim 4, further comprising a downstream filter circuit,
   wherein the low-pass filter is coupled between the downstream filter circuit, the high-pass filter, and the low-impedance node,
   wherein the corner frequency of the high-pass filter is higher than a corner frequency of the low-pass filter, and
   wherein the corner frequency of the low-pass filter is higher than a corner frequency of the downstream filter circuit.

6. The device of claim 1, further comprising:
   an oscillator arranged in the first voltage domain and configured to generate an on-off-keying signal based on an input signal; and
   a driver stage arranged in the first voltage domain,
   wherein the driver stage is configured to amplify the on-off keying signal, and
   wherein the capacitor is configured to communicate the on-off keying signal from the first voltage domain to the second voltage domain.

7. The device of claim 1, further comprising a receiver circuit,
  wherein the low-pass filter is coupled between the high-pass filter, the receiver circuit, and the low-impedance node, and
  wherein the high-pass filter is coupled between the low-pass filter, the capacitor, and the low-impedance node.

8. The device of claim 1, further comprising a package comprising a first die and a second die,
  wherein the capacitor is arranged on the first die, and
  wherein the high-pass filter and the low-pass filter are arranged on the second die.

9. The device of claim 8, wherein the capacitor is a first capacitor, the device further comprising a second capacitor arranged on the second die, wherein the second capacitor is coupled between the first capacitor and the high-pass filter.

10. The device of claim 1, wherein the low-impedance node is a first low-impedance node, the device further comprising:
  a first diode coupled between the high-pass filter, the low-pass filter, and the first low-impedance node; and
  a second diode coupled between the high-pass filter, the low-pass filter, and a second low-impedance node,
  wherein the second low-impedance node is separate from the first low-impedance node, and
  wherein the first diode is coupled to the second diode in a serial arrangement.

11. The device of claim 1,
  wherein the capacitor is a first capacitor,
  wherein the single-ended signal is a first single-ended signal,
  wherein the high-pass filter is a first high-pass filter,
  wherein the low-pass filter is a first low-pass filter,
  wherein the low-impedance node is a first low-impedance node in the second voltage domain,
  and
  wherein the device further comprises:
    a second capacitor arranged across the galvanic isolation barrier;
    a second high-pass filter arranged in the second voltage domain and configured to receive a second single-ended signal from the second capacitor; and
    a second low-pass filter arranged in the second voltage domain and coupled between the second high-pass filter and a second low-impedance node in the second voltage domain,
    wherein the second high-pass filter is coupled between the second capacitor, the second low-pass filter, and the second low-impedance node.

12. A method comprising:
  receiving a single-ended signal from a capacitor arranged across a galvanic isolation barrier, wherein the galvanic isolation barrier separates a first voltage domain from a second voltage domain;
  filtering the single-ended signal through a high-pass filter arranged in the second voltage domain between the capacitor and a low-impedance node to generate a first signal that comprises a high-pass-filtered signal;
  filtering the first signal through a low-pass filter arranged in the second voltage domain between the high-pass filter and the low-impedance node to generate a second signal;
  receiving the first signal from the high-pass filter and the second signal from the low-pass filter at a differential gain stage; and
  outputting a third signal from the differential gain stage based on the first signal and the second signal.

13. The method of claim 12, further comprising generating, by an oscillator arranged in the first voltage domain, the single-ended signal at a transmission frequency,
  wherein the transmission frequency is higher than a corner frequency of the high-pass filter.

14. The method of claim 13, wherein the corner frequency of the high-pass filter is higher than a corner frequency of the low-pass filter.

15. A system arranged to include a galvanic isolation barrier between a first voltage domain and a second voltage domain comprising:
  an oscillator configured to generate a single-ended signal at a transmission frequency, wherein the oscillator is arranged in the first voltage domain;
  a capacitor arranged across the galvanic isolation barrier, wherein the capacitor is configured to communicate the single-ended signal from the first voltage domain to the second voltage domain;
  a high-pass filter arranged in the second voltage domain and coupled between the capacitor and a low-impedance node;
  a low-pass filter arranged in the second voltage domain and coupled between the high-pass filter and the low-impedance node, wherein output of the high-pass filter comprises a first signal that defines input to the low pass filter and wherein the low pass filter is configured to filter the first signal to generate a second signal;
  a differential gain stage, wherein the differential gain stage is configured to:
    receive the first signal from the high-pass filter and the second signal from the low-pass filter, and
    output a third signal based on the first signal and the second signal; and
  a downstream filter circuit arranged in the second voltage domain and configured to filter the third signal,
  wherein the transmission frequency is higher than a corner frequency of the high-pass filter,
  wherein the low-pass filter is coupled between the downstream filter circuit, the high-pass filter, and the low-impedance node,
  wherein the corner frequency of the high-pass filter is higher than a corner frequency of the low-pass filter, and
  wherein the corner frequency of the low-pass filter is higher than a corner frequency of the downstream filter circuit.

16. The system of claim 15, wherein the high-pass filter comprises a resistor coupled between the capacitor and the low-impedance node.

17. The system of claim 15, wherein the capacitor is a first capacitor, and wherein the low-pass filter comprises:
  a resistor coupled to the high-pass filter; and
  a second capacitor coupled between the resistor and the low-impedance node.

18. The system of claim 15, further comprising a package comprising a first die and a second die,
  wherein the oscillator and the capacitor are arranged on the first die, and
  wherein the high-pass filter, the low-pass filter, and the downstream filter circuit are arranged on the second die.

19. The system of claim 15, further comprising a package comprising a first die and a second die,
  wherein the oscillator is arranged on the first die, and
  wherein the capacitor, the high-pass filter, the low-pass filter, and the downstream filter circuit are arranged on the second die.

20. The system of claim 15, wherein the capacitor is a first capacitor, the system further comprising:
- a package comprising a first die and a second die,
- a second capacitor arranged on the second die,
- wherein the oscillator and the first capacitor are arranged on the first die,
- wherein the second capacitor is coupled between the first capacitor and the high-pass filter, and
- wherein the second capacitor, the high-pass filter, the low-pass filter, and the downstream filter circuit are arranged on the second die.

* * * * *